United States Patent Office 3,671,253
Patented June 20, 1972

3,671,253
PHOTOGRAPHIC LIGHT-SENSITIVE MATERIAL ESPECIALLY FOR THE SILVER-DYESTUFF BLEACHING PROCESS
Alfred Froehlich, Marly-le-Grand, Bernhard Piller, Marly-le-Petit, and Thomas Stauner, Marly-le-Grand, Switzerland, assignors to Ciba-Geigy AG, Basel, Switzerland
No Drawing. Filed Mar. 9, 1970, Ser. No. 17,952
Claims priority, application Switzerland, Mar. 25, 1969, 4,477/69
Int. Cl. G03c 1/10
U.S. Cl. 96—99                           14 Claims

ABSTRACT OF THE DISCLOSURE

Photographic light-sensitive material, especially for the silver dyestuff bleaching process, is provided, which contains on a support at least one layer with at least one dyestuff of the formula (1)

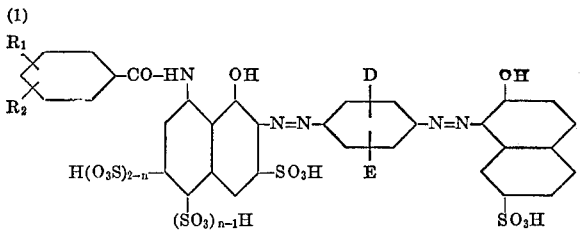

in which $R_1$ represents a methoxy group, a hydrogen or halogen atom, $R_2$ represents a halogen atom or a methyl, methoxy, nitrile, trifluoromethyl, nitro, W—CO—, X—CO—NH—, Y—SO$_2$—NH— or Z—SO$_2$— group, with W representing a hydroxyl, lower alkyl, lower alkoxy or optionally substituted phenyl group, X representing a hydrogen atom, or a hydroxyl, HOOC-alkylene, HOOC-alkenylene, phenyl, HOOC-phenylene, HO$_3$S-phenylene, furyl, thienyl or pyridyl group, Y representing a lower alkyl, phenyl, alkylphenylene or HOOC-phenylene group and Z representing a lower alkyl, a phenyl or an optionally substituted amino group, D and E independently of one another each denote a hydrogen or chlorine atom or a methyl, methoxy, ethoxy or hydroxyethoxy group, and n denotes 1 or 2.

These dyestuffs at the same time have excellent resistance to diffusion, form stable aqueous solutions, are insensitive to calcium ions, can be easily bleached, and have favorable spectral properties.

The subject of the invention is a photographic, light-sensitive material, especially for the silver dyestuff bleaching process, characterised in that it contains, on a support, at least one layer with at least one dyestuff of formula (1)

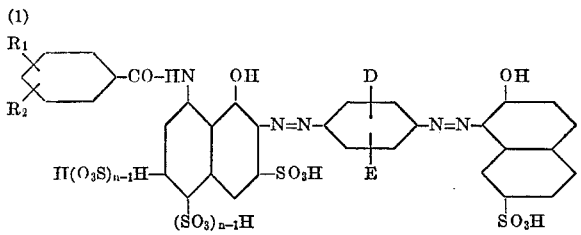

wherein the radicals $R_1$ and $R_2$ are in the 3-, 4- or 5-position to the —CO— group and $R_1$ represents a methoxy group, a hydrogen or halogen atom, $R_2$ represents a halogen atom or a methyl, methoxy, nitrile, trifluoromethyl, nitro, W—CO—, X—CO—NH—,

Y—SO$_2$—NH— or Z—SO$_2$— group, with W representing a hydroxyl, lower alkyl, lower alkoxy or optionally substituted phenyl group, X representing a hydrogen atom, or a hydroxyl, HOOC-alkylene, HOOC-alkenylene, phenyl, HOOC-phenylene, HO$_3$S-phenylene, furyl, thienyl or pyridyl group, Y representing a lower alkyl, phenyl, alkylphenylene or HOOC-phenylene group and Z representing a lower alkyl, a phenyl or an optionally substituted amino group, D and E independently of one another each denote a hydrogen or chlorine atom or a methyl, methoxy, ethoxy or hydroxyethoxy group, and n denotes 1 or 2.

Dyestuffs which are very suitable correspond to the formula (2)

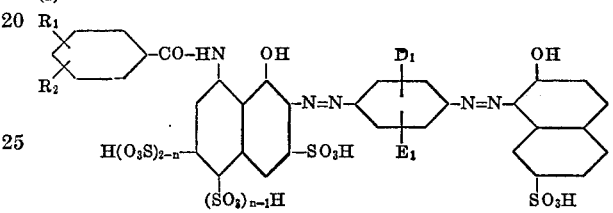

wherein $D_1$ and $E_1$ independently of one another each denote a methyl, methoxy, ethoxy or hydroxyethoxy group and $R_1$, $R_2$ and n have the indicated significance.

Amongst these dyestuffs, those of formula (3)

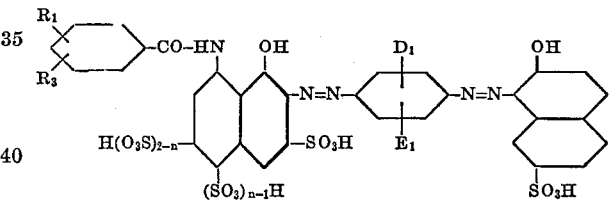

wherein $R_3$ denotes a halogen atom or a methyl, methoxy, trifluoromethyl, nitro, nitrile, W—CO—, X$_2$—CO—NH—, Y—SO$_2$—NH— or Z—SO$_2$— group, with $X_2$ denoting a hydrogen atom or a hydroxyl, HOOC-alkylene, HOOC-alkenylene, phenyl or thienyl group, and $R_1$, W, Y, Z, $D_1$, $E_1$ and n have the abovementioned significance, occupy a preferred position.

Amongst the dyestuffs of Formula 1, those of formula (4)

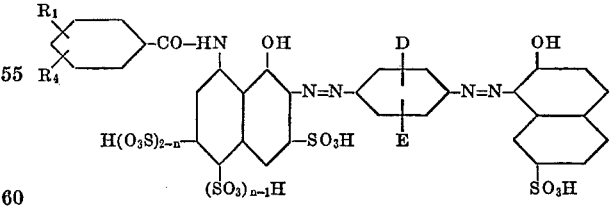

are of particular interest, wherein the radicals $R_1$ and $R_4$ are in the 3-, 4- or 5-position to the —CO— group and $R_1$ represents a methoxy group or a hydrogen or halogen atom, $R_4$ represents a halogen atom or a methyl, methoxy, trifluoromethyl, nitro, $X_3$—CO—NH,

Y—SO$_2$—NH— or $Z_1$—SO$_2$— group, with $X_3$ representing a hydroxyl, HOOC-alkylene, HOOC-alkenylene, phenyl, HOOC-phenylene, HO$_3$S-phenylene, furyl, thienyl or pyridyl group, Y representing a lower alkyl, phenyl, alkyl-phenylene or HOOC-phenylene group and $Z_1$ representing a lower alkyl or an optionally substituted amino group; D and E independently of one another each denote a hydrogen or chlorine atom or a methyl, methoxy, ethoxy or hydroxy-ethoxy group and $n$ denotes 1 or 2.

The material also preferentially contains a dyestuff of formula (5)
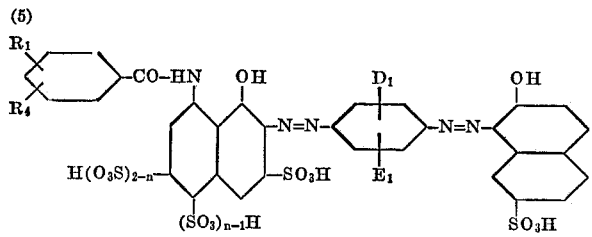

or especially of formula (6)
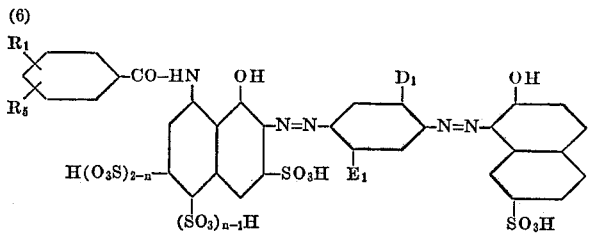

wherein $R_5$ denotes a halogen atom or a methyl, methoxy, trifluoromethyl, nitro, $X_4$—CO—NH—,

Y—SO$_2$—NH— or $Z_2$—SO$_2$— group, with $X_3$ representing a hydroxyl, HOOC-alkylene, HOOC-alkenylene, phenyl or thiënyl group, and $R_1$, $R_4$, Y, $Z_1$, $E_1$, $D_1$ and $n$ having the indicated significance.

Dyestuffs of formula (7)
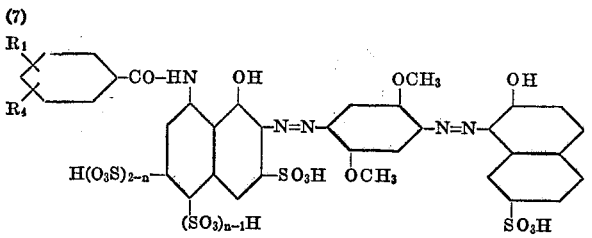

wherein $R_1$, $R_4$ and $n$ have the indicated significance, are also particularly advantageous.

Particularly suitable photographic material contains a dyestuff of formula (8)
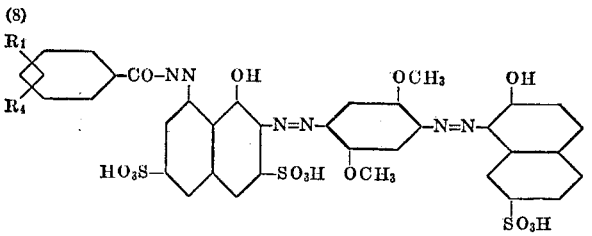

wherein $R_1$ and $R_4$ have the indicated significance.

A photographic light-sensitive material which contains a dyestuff of formula (9)
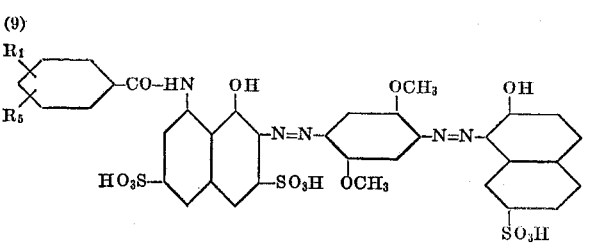

wherein $R_1$ and $R_5$ have the indicated significance, is of particular interest.

Amongst the dyestuffs of Formula 9, those of formula

(10)
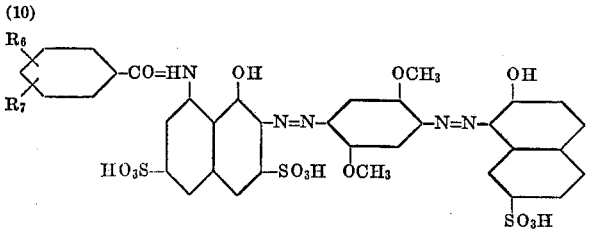

are above all distinguished by good properties, wherein $R_6$ and $R_7$ are in the 3- and 4-position to the —CO— group and $R_6$ denotes a hydrogen or chlorine atom, $R_7$ denotes a chlorine atom or a methyl, methoxy, trifluoromethyl, nitro, $X_5$—CO—NH—, $CH_3$—SO$_2$—NH— or $Z_1$—SO$_2$— group, and wherein $X_5$ represents a hydroxyl, HOOC-alkylene or HOOC-alkenylene group and $Z_1$ represents a lower alkyl group or an optionally substituted amino group. The alkylene, alkenylene and alkyl residues in $X_5$ and $Z_1$ respectively, preferably contain at most 4 carbon atoms.

A photographic, light-sensitive material which contains a dyestuff of formula

(11)
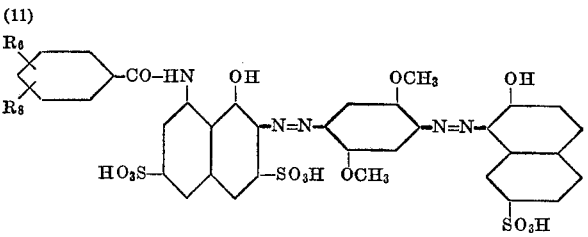

has proved advantageous, wherein the radicals $R_6$ and $R_8$ are in the 3- and 4-position to the —CO— group, $R_6$ denotes a hydrogen or chlorine atom and $R_8$ denotes a chlorine atom or a trifluoromethyl, nitro, HOOC—NH—, HOOC—CH$_2$CH$_2$—CO—NH—,

HOOC—CH$_2$CH$_2$CH$_2$—CO—NH—

HOOC—CH=CH—CO—NH—, H$_3$C—SO$_2$—NH

H$_3$C—SO$_2$—

H$_2$N—SO$_2$— or H$_3$C—NH—SO$_2$— group.

Dyestuffs of formula

(12)
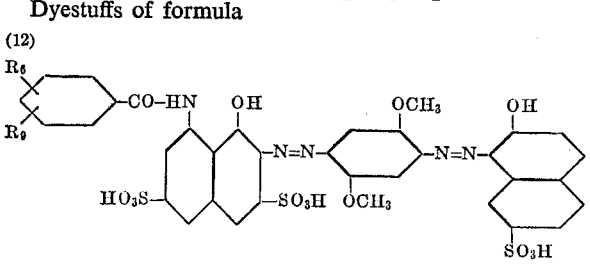

wherein the radicals $R_6$ and $R_9$ are in the 3- and 4-position to the —CO— group, $R_6$ denotes a hydrogen or chlorine atom and $R_9$ denotes a group of formula

HOOC—CH$_2$CH$_2$—CO—NH—

HOOC—CH$_2$CH$_2$CH$_2$—CONH—, CH$_3$—SO$_2$—NH—, CH$_3$—SO$_2$— or H$_2$N—SO$_2$—, are here preferred.

Particularly favourable results are achieved with photographic, light-sensitive material which contains a dyestuff of formula

(13)
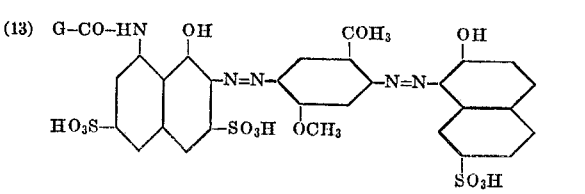

wherein G represents a radical of formula (13.1) 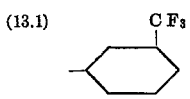

(13.2) 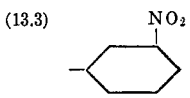

(13.3) 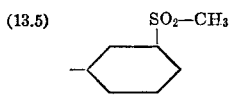

(13.4) 

or especially of formula (13.5) 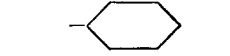

(13.6) 

(13.7) 

(13.8) 

(13.9) 

(13.10) -⟨⟩-NH—COCH$_2$CH$_2$CH$_2$COOH (13.11) -⟨⟩-Cl
         NH—CO—CH$_2$CH$_2$CH$_2$COOH or (13.12) -⟨⟩-NH—SO$_2$—CH$_3$ such as for example the dyestuff of formula

(14)
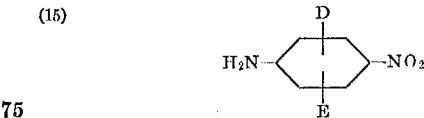

The radicals

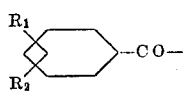

are for example derived from the following acids or their halides:

3-chlorobenzoic acid,
4-chlorobenzoic acid,
4-bromobenzoic acid,
4-fluorobenzoic acid,
3-toluic acid,
4-toluic acid,
3-trifluoromethylbenzoic acid,
4-trifluoromethylbenzoic acid,
3-methoxybenzoic acid,
4-methoxybenzoic acid,
3-nitrobenzoic acid,
4-nitrobenzoic acid,
3,4-dichlorobenzoic acid,
4-chloro-3-methylbenzoic acid,
3-chloro-4-methylbenzoic acid,
4-chloro-3-nitrobenzoic acid,
5-chloro-3-nitrobenzoic acid,
4-methoxy-3-methylbenzoic acid,
3-methoxy-4-nitrobenzoic acid,
3,5-dimethoxybenzoic acid,
3-sulphonamidobenzoic acid, 4-sulphonamidobenzoic acid,
4-chloro-3-sulphonamidobenzoic acid,
4-chloro-3-methylsulphonamidobenzoic acid,
3-methylsulphonylbenzoic acid,
4-methylsulphonylbenzoic acid,
4-acetylbenzoic acid,
4-benzoylbenzoic acid,
4-(4'-chlorobenzoyl)-benzoic acid,
4-(3',4'-dichlorobenzoyl)-benzoic acid,
4-phenylsulphonylbenzoic acid,
4-formylaminobenzoic acid,
4-thienoylaminobenzoic acid,
4-cyanobenzoic acid,
4-carboxybenzoic acid,
4-methoxycarbonylbenzoic acid and
4-toluoylbenzoic acid.

The radicals —COX in the radical —NH—COX occurring as the substituent $R_2$ are for example derived from the following acids or their halides or anhydrides: formic acid, maleic acid, succinic acid, fumaric acid, glutaric acid, adipic acid, pimelic acid, benzoic acid, 4-methylbenzoic acid, 3-chlorobenzoic acid, 4-chlorobenzoic acid, isophthalic acid, terephthalic acid, 3-sulphobenzoic acid, furane-2-carboxylic acid, thiophene-2-carboxylic acid, pyridine-2-, -3- or -4-carboxylic acid.

The radicals —SO$_2$Y in the radical —NH—SO$_2$Y occurring as the substituent $R_2$ are for example derived from the following acids or their halides: methanesulphonic acid, benzenesulphonic acid, 4 - methylbenzenesulphonic acid and 3-sulphobenzoic acid.

The radicals

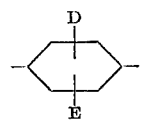

are for example derived from the following amines:
1-amino-2,5-dimethoxy-4-nitrobenzene,
1-amino-2,5-dimethoxy-4-formylaminobenzene,
1-amino-2,5-dimethoxy-4-acetylaminobenzene,
1-amino-2,5-diethoxy-4-nitrobenzene,
1-amino-2-chloro-4-nitrobenzene,
1-amino-3-chloro-4-nitrobenzene,
1-amino-2-methyl-4-nitrobenzene,
1-amino-2-methoxy-4-nitrobenzene,
1-amino-2-ethoxy-4-nitrobenzene,
1-amino-2-hydroxyethoxy-4-nitrobenzene,
1-amino-2-methyl-5-methoxy-4-nitrobenzene,
1-amino-2-methoxy-5-methyl-4-nitrobenzene,
1-amino-2-methoxy-5-hydroxyethoxy-4-nitrobenzene,
1-amino-2-hydroxyethoxy-5-methyl-4-nitrobenzene,
1-amino-2,3-dimethyl-4-nitrobenzene and
1-amino-2,6-dimethoxy-4-nitrobenzene.

The dyestuffs of Formula I can be manufactured according to various processes which are in themselves known. Thus it is for example possible to diazotise an amine of formula

(15) H$_2$N-⟨⟩-NO$_2$
         D
         E or of formula

(16) 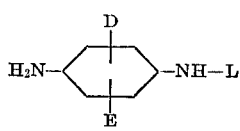

wherein L denotes a protective group which can be split off, and to couple it with a 1-amino-8-naphthol-disulphonic acid of formula

(17) 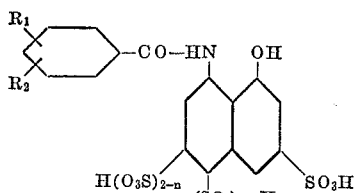

After reduction of the nitro group to the amino group or splitting off of the protective group the compound is again diazotised and coupled with 2-naphthol-7-sulphonic acid, with D, E, $R_1$, $R_2$ and $n$ having the indicated significance.

Another process consists in diazotising an amine of Formula 15 or 16, coupling it with 2-naphthol-7-sulphonic acid and reducing the nitro group or splitting off the protective group L. The intermediate product obtained in this manner, of formula

(18) 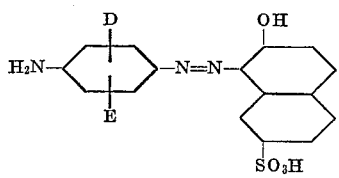

wherein D and E have the indicated significance, is again diazotised and coupled with a compound of Formula 17.

Finally it is also possible to couple the product of Formula 18 with an aminonaphtholdisulphonic acid of formula

(19) 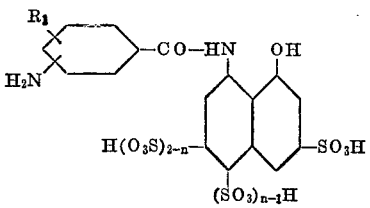

wherein $R_1$ has the indicated significance, and condense the free amino group with one of the acid halides or anhydrides from which the radicals —COX and —$SO_2Y$ are derived.

The dyestuffs of Formula 1 cannot only, as indicated, be in the form of their free acids, that is to say with HOOC— or $HO_3S$— groups, but also as salts. Depending on the conditions of the separation, for example on the chosen pH-value or on the cation which the salt used for the separation possesses, the acid groups can be present as —$SO_3$— or —COO-cation groups, such as for example —$SO_3Na$, —$SO_3K$, (—$SO_3)_2Ca$, —COONa, —COOLi or —$COONH_4$.

The dyestuffs of Formula 1 are used in photographic materials and here particularly advantageously as image dyestuffs for the silver dyestuff bleaching process. Accordingly, valuable photographic materials can be manufactured in the usual manner which is in itself known, which contain, on a layer support, at least one layer with a dyestuff of Formula 1.

In particular, these dyestuffs can be present in a multilayer material which contains, on a layer support, a layer which is dyed green-blue with a dyestuff of Formula 1 and is selectively red-sensitive, on top of this a layer which is dyed with a purple dyestuff and is selectively green-sensitive and finally a layer which is dyed with a yellow dyestuff and is blue-sensitive. It is however also possible to incorporate the dyestuffs of Formula 1 into an auxiliary layer or especially into a layer adjacent to the light-sensitive layer.

The extremely favourable and very difficult to achieve combination of numerous outstanding properties in one and the same molecule, as is realised in the dyestuffs of Formula 1, above all comes into its own when they are used as dyestuffs for direct-viewing images.

The dyestuffs of Formula 1 can furthermore for example also be used for retouching purposes.

In most cases it suffices to add the dyestuffs to be used according to the invention as a solution in water or in a solvent miscible with water, at normal or slightly elevated temperature, to an aqueous gelatine solution, with good stirring. Thereafter this mixture is, where appropriate, brought together with a gelatine solution containing silver halide and/or other materials for producing photographic images, cast as a layer onto a substrate in the usual manner, and dried if appropriate.

The dyestuff solution can also be directly added to a gelatine solution containing silver halide and/or other materials for producing photographic images. Thus it is for example possible only to add the dyestuff solution immediately before casting.

Instead of simple stirring, the usual methods of distribution by means of kneading and/or shear forces or ultrasonics can also be employed.

It is also possible to add the dyestuff, not as a solution, but in the solid form or as a paste.

The casting solution can contain yet further additives such as hardeners, sequestering agents and wetting agents as well as sensitisers and stabilisers for the silver halide.

The dyestuffs neither undergo chemical reactions with the light-sensitive materials nor significantly impair their light sensitivity.

The dyestuffs of Formula 1 at the same time have excellent resistance to diffusion but also form stable aqueous solutions, are insensitive to calcium ions, and can be easily bleached down to white.

Thus they have significantly better resistance to diffusion than, for example, the dyestuffs of formula

(20) 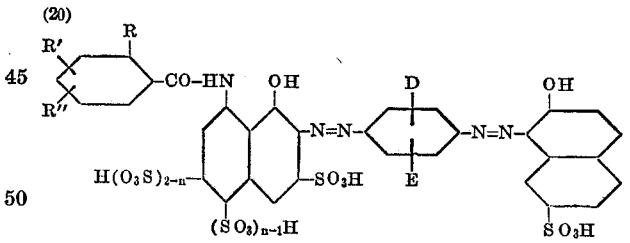

wherein R denotes any desired substituent, R' and R'' denote a hydrogen atom or any desired substituent and D, E and $n$ have the indicated significance.

The bleachability is significantly better than in the case of dyestuffs of formula

(21) 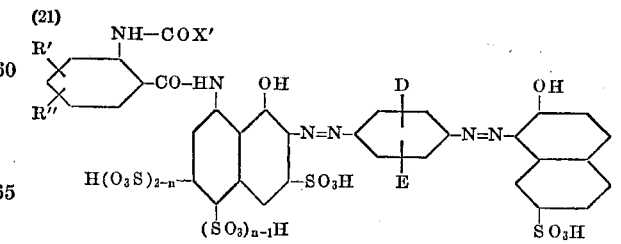

wherein X' denotes an alkyl residue and D, E, $n$, R' and R'' have the indicated significance.

The dyestuffs of Formula 1 neither cause an objectionable increase in viscosity on addition to the casting solution nor a significant change in viscosity on standing of the ready-to-cast mixture.

The particular advantage of the dyestuffs of Formula 1 however resides in the extremely favourable spectral properties. Their absorption maximum in gelatine is generally in the range of 610 to 650 nm. so that they can in particular be combined with a purple dyestuff of which the absorption maximum is at about 565 nm. and a yellow dyestuff with an absorption maximum of about 420 nm. to give a triple dyestuff combination which shows significantly more advantageous properties with respect to exposure metamerism as compared to materials with other blue-green dyestuffs. Furthermore grey shades which appear neutral to the eye are achieved over the entire density range.

The dyestuffs of Formula 1 also show low subsidiary colour densities in the green and blue spectral region and a particularly low transmission in the red spectral region. The flanks of the absorption curves are extraordinarily steep, above all in the direction towards shorter wavelength ranges.

MANUFACTURING INSTRUCTIONS FOR STARTING PRODUCTS OF FORMULA 17

(A) 24.1 g. of 1-p-(amino-benzoyl-amino)-8-naphthol-3,6-disulphonic acid are warmed to 150° C. with 160 ml. of N-methyl-2-pyrrolidone and 10 ml. of pyridine, and the mixture is cooled to 60° C. and slowly mixed with 8 ml. of methanesulphonyl chloride. The temperature rises to 115° C. The addition of methanesulphonyl chloride is continued until no further amino group is detectable in the sample by diazotising and coupling with β-naphthol. 500 ml. of isopropanol are added at 60° C., the mixture is cooled to 20° C. and the product is filtered off and washed three times with 100 ml. of isopropanol at a time. The product is then dissolved by means of 100 ml. of water, adjusted to pH 10 with 10 N sodium hydroxide solution, the mixture is warmed to 60° C. for 20 minutes, cooled and rendered acid to Congo red by means of 37% strength hydrochloric acid, 200 ml. of isopropanol are added, and the product is filtered off and washed with 100 ml. of isopropanol.

Yield after drying at 60° C. in vacuo: 18 g. of 1-(p-methylsulphonylamino - benzoyl - amino) - 8 - naphthol-3,6-disulphonic acid.

1 - (p - phenylsulphonylamino - benzoyl - amino - 8)-naphthol - 3,6 - disulphonic acid and 1 - (p - 4' - methylphenylsulphonylamino - benzoyl - amino) - 8 - naphthol-3,6-disulphonic acid are manufactured analogously.

(B) 101.5 g. (0.25 mol) of 78.6% strength 1-amino-8-hydroxy-naphthalene-3,6-disulphonic acid are suspended in 500 ml. of water and dissolved by adding 40% strength sodium hydroxide solution until a pH-value of 7.5 is reached. The mixture is warmed to 40–50° C. and a total of 88 g. of 3-nitro-4-chlorobenzoyl chloride is added in portions of 2 to 3 g. with good stirring, with the pH-value of the solution being kept at between 6 and 7.5 by dropwise addition of 40% strength sodium hydroxide solution. The mixture is stirred for a further 2 hours at the same temperature, heated to 60–70° C., acidified with 37% strength hydrochloric acid to pH 2, and the reaction product precipitated with 300 ml. of ethanol. After cooling, the yellowish crystalline material is filtered off and the product is washed with a little ethanol. For further purification, the product is dissolved in 300 ml. of H₂O by warming to 80° C. and again precipitated with 300 ml. of ethanol. After cooling, the crystalline product is filtered off, washed with ethanol and dried in vacuo at 60° C., and 150 mm. Hg. 75 g. of a product of formula (22.1) 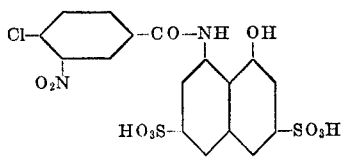

are obtained in the form of a yellowish powder. The thin layer chromatogram only shows one yellow zone. The infrared and NMR spectra are in agreement with the required molecular structure.

The 1 - acylamino - 8 - hydroxynaphthalene - 3,6 - disulphonic acids of the following formulae are manufactured analogously:

(22.2) 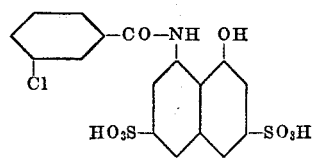

(22.3) 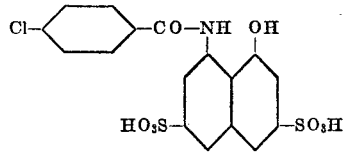

(22.4) 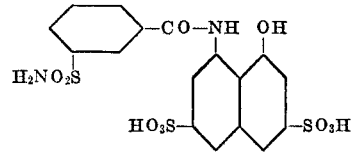

(22.5) 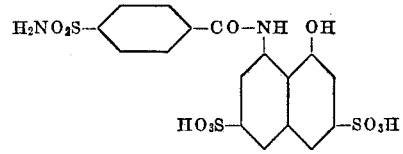

(22.6) 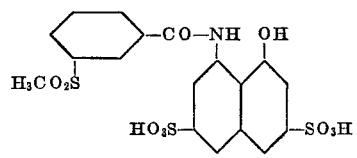

(22.7) 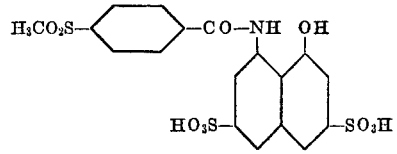

(22.8) 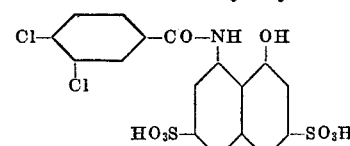

(22.9) 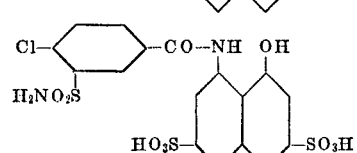

(22.10) 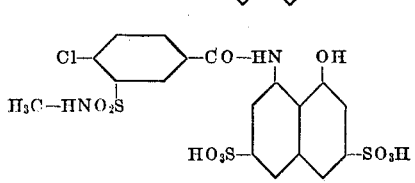

(22.11) 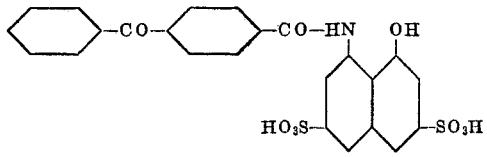

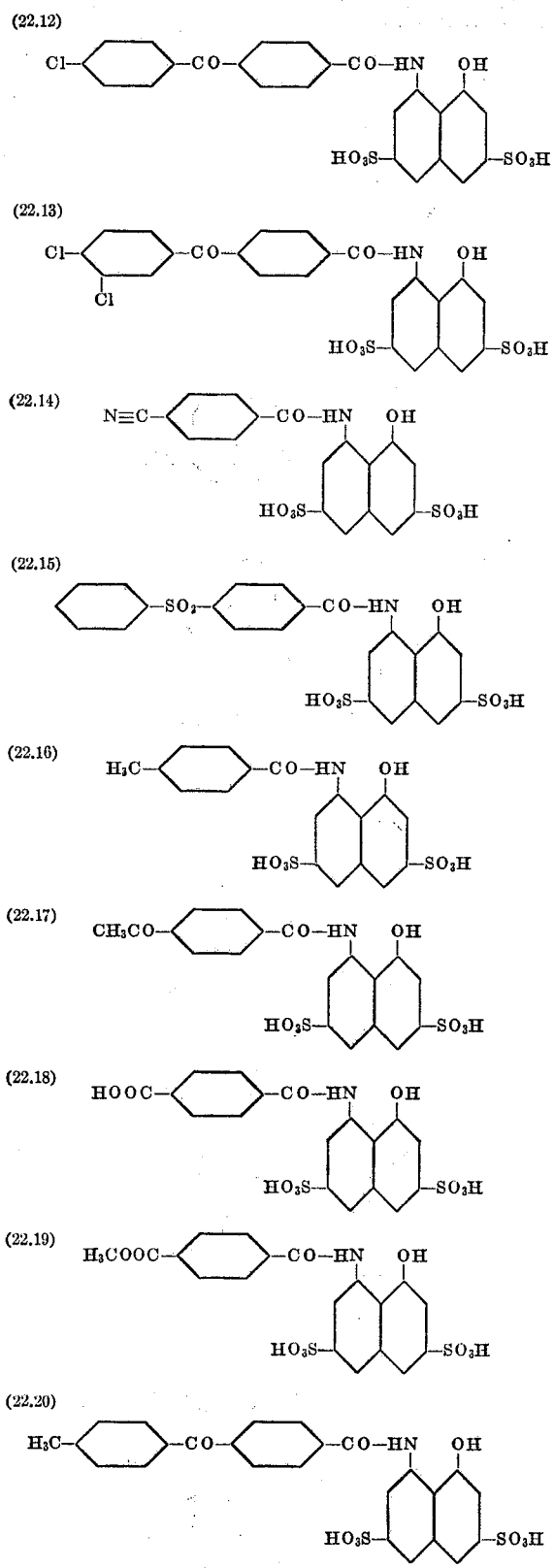

(C) 48 g. of 1 - p-(aminobenzoylamino)-8-naphthol-3,6-disulphonic acid are warmed to 180° for 20 minutes with 180 ml. of N-methyl-2-pyrrolidone and 40 g. of succinic anhydride. The acylation is controlled by diazotisation and coupling with β-naphthol using a spot test. When no further amine is detectable, the mixture is cooled for 3 hours in ice water, the product is filtered off and washed with 100 ml. of N-methyl-2-pyrrolidone, and the residue is boiled for one hour with 300 ml. of ethanol, filtered off hot, washed three times with 100 ml. of ethanol and dried at 100° C.

39 g. of 1-(p-succinylaminobenzoylamino)-8-naphthol-3,6-disulphonic acid are obtained.

1-(p-glutaryl-aminobenzoylamino) - 8 - naphthol - 3,6-disulphonic acid is manufactured analogously. In this case it is necessary to precipitate the product by adding 500 ml. of chloroform to the N-methyl-2-pyrrolidone solution.

(D) 100 ml. of water, 10 ml. of 37% strength hydrochloric acid and 10 g. of iron are boiled for 1 hour whilst stirring. A solution of 64 g. of 1-(4'-chloro-3'-nitrobenzoylamino) - 8 - naphthol - 3,6 - disulphonic acid in 500 ml. of water is then run in at 90° C. over the course of 1 hour. The mixture is stirred for a further 3 hours at 90° C., adjusted to a pH-value of 9 with sodium carbonate and filtered hot, and the mother liquor is mixed with 100 g. of sodium chloride and adjusted to a pH-value of 1 with hydrochloric acid. After cooling to room temperature the mixture is filtered, and the residue is washed with 500 ml. of 10% strength sodium chloride solution and dried in vacuo at 60° C. After recrystallising from 400 ml. of water, 30 g. of colourless crystals of 1-(4'-chloro-3'-aminobenzoylamino) - 8 - naphthol-3,6-disulphonic acid are obtained.

If a sample is dissolved in a little water, mixed with sodium nitrite and treated with a β-naphthol solution rendered alkaline with sodium carbonate, a red dyestuff is obtained.

10 g. of 1-(4'-chloro-3' - aminobenzoylamino) - 8-naphthol-3,6-disulphonic acid, 20 ml. of dimethylformamide and 10 g. of glutaric acid anhydride are boiled for one hour. The complete acylation is checked by dissolving a sample in water, chromatographing and diazotising the chromatogram and coupling it with β-naphthol. No red dyestuff must be produced. When the acylation is complete, 100 ml. of acetone are added, the mixture is boiled for one hour, and the product is filtered off hot and washed with 100 ml. of acetone.

9 g. of 1 - (4'-chloro-3'-glutarylaminobenzoylamino)-8-naphthol-3,6-disulphonic acid are obtained 1-(3'-glutarylaminobenzoylamino)-8-naphthol - 3,6 - disulphonic acid is manufactured in an analogous manner.

(E) 10 g. of 1-(p-aminobenzoylamino) - 8 - naphthol-3,6-disulphonic acid are finely powdered and warmed to 150° C. with 60 ml. of N-methyl-2-pyrrolidone; a fine suspension is produced, which is cooled to 15° C. and slowly mixed at this temperature with 15 ml. of chloroformic acid ethyl ester. The mixture is stirred for 10 minutes at this temperature, and the temperature is then raised to 55° C. over the course of 15 minutes. The temperature then continues to rise to 82° C. of its own accord, and dissolution occurs. When the temperature drops, the mixture is warmed and kept at 85° C. for 15 minutes. After this time, no further amino group is detectable by diazotising a sample and coupling with β-naphthol.

The clear reaction solution is mixed with 200 ml. of ether; a yellow oil separates out. The ether is decanted and the oil is stirred with 100 ml. of acetone. A grey powder is obtained, which is filtered off and washed with 50 ml. of acetone.

After recrystallising from 20% strength sodium chloride solution, 8 g. of colourless crystals of 1-(4'-ethoxycarbonylaminobenzoylamino)- 8- hydroxynaphthalene - 3,6-disulphonic acid are obtained.

(F) 24.1 g. of 1 - (p-aminobenzoylamino)-8-naphthol-3,6 - ditsulphonic acid, 200 ml. of N-methyl-2-pyrrolidone and 30 g. of maleic anhydride are warmed to 140° C. for one hour. A sample is diazotised and coupled with β-naphthol. When no further red dyestuff is produced, the acylation is complete. If this is not the case, warming must be continued. The mixture is filtered, the mother liquor is mixed with 1000 ml. of acetone, and the precipitate is filtered off and washed with 200 ml. of acetone.

It is dissolved in 30 ml. of water, the solution is filtered and mixed with 500 ml. of ethanol, the mixture is filtered and the residue is washed wth 100 ml. of ethanol.

18 g. of colourless powder which does not contain any diazotisable amino group are obtained.

(G) 24.1 g. of 1-(p-aminobenzoylamino)-8-naphthol-3,6-disulphonic acid are dissolved in 300 ml. of water, adjusted to pH 8 and slowly mixed with 12 g. of benzoyl chloride at 50° C., with the pH-value being kept at 8 by adding sodium carbonate. The addition of benzoyl chloride is continued until a sample of the reaction solution does not yield a dyestuff on diazotising and coupling.

The mixture is filtered, the filtrate is mixed with 70 g. of sodium chloride, and the product is filtered off and washed with 200 ml. of 10% strength sodium chloride solution. It is dried at 60° C. in vacuo, and the dry material is powdered, boiled for one hour with 300 ml. of ethanol, filtered off hot and rinsed with 100 ml. of ethanol.

23 g. of 1-(p-benzoylamino-benzoylamino)-8-naphthol-3,6-disulphonic acid are obtained.

(H) 24.1 g. of 1-(p-aminobenzoylamino)-8-naphthol-3,6-disulphonic acid in 100 ml. of N-methyl-2-pyrrolidone and 20 ml. of pyridine are warmed to 110° C. 18 g. of benzoic acid 3-sulphochloride are then added. After 10 minutes a sample is taken and the complete reaction of the amino group is checked by diazotising and coupling. The addition of benzoic acid 3-sulphochloride is continued until a dyestuff is no longer produced by diazotising and coupling a sample.

The reaction solution is then stirred into 1000 ml. of isopropanol, the mixture is cooled to 10° C., and the product is filtered off and washed with 300 ml. of isopropanol. The residue is dissolved, without drying it, in 400 ml. of alcohol, and the solution is adjusted to a pH-value of 9 with 10 N sodium hydroxide solution and warmed to 70° C. for 20 minutes. The mixture is then cooled to 0° C. and the product is filtered off and washed with 20 ml. of alcohol.

17 g. of the compound of formula (23)

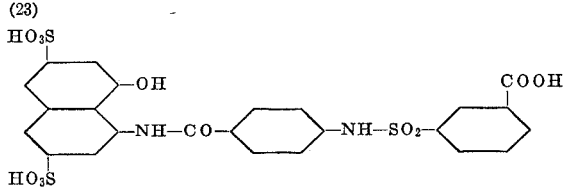

are obtained.

(I) 20 g. of 1-(p-aminobenzoylamino)-8-naphthol-3,5-disulphonic acid are dissolved in 40 ml. of dimethylformamide and 4 ml. of pyridine at 110° C. and mixed with 20 g. of glutaric anhydride. The mixture is stirred for one hour at this temperature and the complete acylation of the amino group is checked by diazotising and coupling a sample. The reaction solution is filtered and the 1-(p-glutaryl-aminobenzoylamino)-8-naphthol-3,5-disulphonic acid is precipitated from the mother liquor. It is filtered off and washed with 200 ml. of hot ethanol, the residue is dissolved in 50 ml. of water, the solution is adjusted to a pH-value of 9 with sodium hydroxide solution, heated to the boil, neutralised with acetic acid, and the boiling solution mixed with ethanol until it begins to turn cloudy. The mix is cooled for 3 hours in ice and the product is filtered off, washed with 200 ml. of hot ethanol and dried in vacuo at 60° C. Yield: 14 g.

(J) 12 g. of 1-(p-aminobenzoylamino)-8-naphthol-3,5-disulphonic acid, 50 ml. of N-methyl-2-pyrrolidone and 5 ml. of pyridine are stirred at 60° C. to give a suspension and are slowly mixed with 4 ml. of methanesulphochloride. In the course thereof, the temperature rises to 89° C. The complete reaction of the amino group with the methanesulphochloride is checked by diazotising and coupling a sample. The reaction solution is introduced into 200 ml. of isopropanol and the precipitate is filtered off and washed with 100 ml. of isopropanol. The residue is dissolved in 25 ml. of water, adjusted to a pH-value of 9 with sodium hydroxide solution, boiled for one minute and then mixed hot with 70 ml. of ethanol and neutralised with acetic acid. After cooling to room temperature, the 1-(4'-methyl - sulphonylaminobenzoylamino)-8-naphthol-3,5-disulphonic acid which has separated out is filtered off, washed with 100 ml. of ethanol and dried in vacuo at 60° C. Yield: 7 g.

(K) 75.2 g. (0.2 mol) of 1-amino-8-hydroxy-naphthalene-3,6-disulphonic acid are suspended in 300 ml. of N-methyl-2-pyrrolidone (dried over sodium sulphate) at 60° C. by means of good stirring and 132 g. (0.6 mol) of 4-bromobenzoyl chloride are added in portions over the course of one hour, provision being made, by warming, for the temperature to rise to 100° C. towards the end of the addition. The reaction is allowed to take place for 2 hours at this temperature, the temperature is then lowered to 60° C. and the mixture is stirred for a further 3 hours. After cooling, the solvent and the excess 4-bromobenzoyl chloride are extracted from the reaction mixture by means of ether, the above residue is dissolved in 50 ml. of water, and the reaction product is precipitated with saturated sodium chloride solution.

After standing overnight, the product is filtered off, crystallised from a little ethanol/H$_2$O (2:1) and dried in vacuo at 60° C. (150 mm. Hg). 60 g. of a powder of formula (24.1)

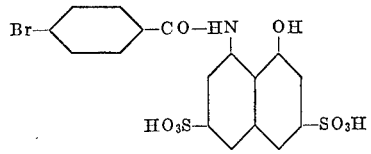

which according to a thin layer chromatogram is a single substance, are obtained. The IR and NMR spectra are in agreement with this structure.

The 1-acylamino-8-hydroxynaphthalene-3,6-disulphonic acid of formula (24.2)

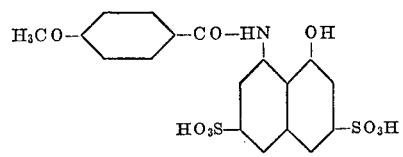

is obtained in an analogous manner.

(L) 31.9 g. of 1-amino-8-naphthol-3,6-disulphonic acid are dissolved in 300 ml. of water at a pH-value of 7, 16.4 g. of anhydrous sodium acetate are added, and this solution is treated with 16.7 ml. of 3-trifluoromethyl-benzoyl fluoride over the course of 15 minutes under reflux, whilst stirring. After 30 minutes a further 16.7 ml. of 3-trifluoromethyl-benzoyl fluoride are added, the pH-value is adjusted to 10.0 with sodium carbonate, the mixture is heated under reflux for 30 minutes, and the pH-value is finally adjusted to 4.5 by adding 37% strength hydrochloric acid.

The resulting precipitate is filtered off and dried. The product of formula

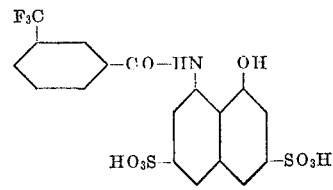

is obtained in 80% yield in the form of a light beige powder.

(M) 115 g. of the benzenesulphonic acid ester of 1-amino-8-naphthol-3,6-disulphonic acid are dissolved at 90° C. in 300 ml. of N-methyl-2-pyrrolidone, 30 ml. of pyridine and 58 g. of 3-nitrobenzoyl chloride are added, and the mixture is stirred for 5 minutes at 175° C.

The reaction solution is cooled to 20° C. and mixed with 1000 ml. of ethanol, whereupon the reaction product, coloured beige, precipitates. It is filtered off, washed with ethanol and dried in vacuo, and the product of formula (26.1)

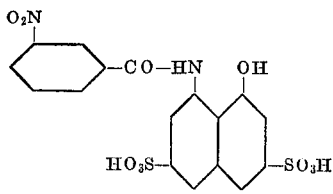

is obtained in very good yield. The compound of formula (26.2)

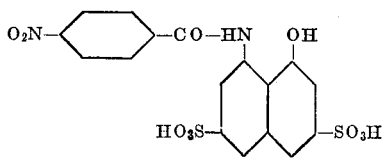

is obtained analogously.

(N) 24.1 g. of 1-(p-aminobenzoylamino)-8-naphthol-3,6-disulphonic acid are warmed to 100° C. with 200 ml. of N-methylpyrrolidone and 40 ml. of pyridine and 14 g. of thiophene-2-carboxylic acid chloride are added dropwise at this temperature. The dropwise addition of the acid chloride is continued until a sample of the reaction solution no longer shows any free amino group by diazotising and coupling with β-naphthol. The reaction solution is then introduced into 150 ml. of isopropanol and the precipitate is filtered off and washed with 200 ml. of isopropanol. The residue is dissolved in 150 ml. of water and 20 g. of 10 N sodium hydroxide solution, the mixture is filtered and the filtrate is treated with 75 ml. of 25% strength sodium chloride solution. The product which has separated out is filtered off, dried in vacuo at 60° C. and recrystallised from 80 ml. of dimethylformamide.

18 g. of product of formula (72)

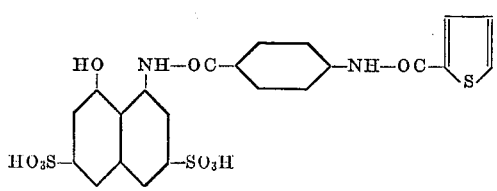

are obtained.

(O) 5 g. of 1-(p-aminobenzoylamino)-8-naphthol-3,6-disulphonic acid, 20 ml. of anhydrous formic acid and 8.5 g. of freshly dehydrated sodium acetate are boiled for ½ hour, 100 ml. of glacial acetic acid are added, the mixture is cooled to 10° C. and the crystals which have separated out are washed with 20 ml. of glacial acetic acid. They are dissolved in 10 ml. of water at 90° C., the solution is adjusted to a pH-value of 10 with 10 N sodium hydroxide solution, the mixture is filtered and 1-(p-formyl-aminobenzoylamino)-8-naphthol-3,6-disulphonic acid is precipitated from the filtrate by means of 30 ml. of ethanol. After cooling to 10° C., the precipitate is filtered off and washed with 30 ml. of ethanol.

After drying at 40° C. in vacuo, 5.6 g. of colourless crystals are obtained.

(P) 23.5 g. of the benzenesulphonic acid ester of 1-amino-8-naphthol-3,6-disulphonic acid are dissolved in 40 ml. of N-methylpyrrolidone, 30 ml. of pyridine are added, the mixture is warmed to 110° C. and 30 g. of 3,5-dimethoxybenzoyl chloride are added. The reaction solution is stirred into 600 ml. of acetone, whereupon an oil separates out. The supernatant acetone is decanted, the residue is taken up in 60 ml. of ethanol, adjusted to pH 12 with 10 N sodium hydroxide solution, the mixture stirred for 10 minutes at room temperature and filtered, and the product precipitated from the filtrate by means of 400 ml. of acetone. The precipitate is filtered off and washed with 100 ml. of acetone.

After drying in vacuo at 50° C., 80 g. of colourless crystals are obtained.

EXAMPLES OF THE MANUFACTURE OF DYESTUFFS OF FORMULA I

Example 1

(1.1) 2.15 g. of 1 - (4'-amino-2',5'-dimethoxyphenylazo)-2-naphthol-7-sulphonic acid are dissolved in 100 ml. of water and 1.25 ml. of 4 N sodium nitrite solution are added. The mixture is cooled to 0–2° C. and 10 ml. of naphthalene-sulphonic acid solution are added (1 litre of this naphthalenesulphonic acid solution contains 1 mol of α-naphthalenesulphonic acid and 1 mol of sulphuric acid). The mixture is stirred for 2 hours at 2 to 4° C.

(1.2) 6.5 g. of 1 - (p-methylsulphonyl-aminobenzoyl-amino)-8-naphthol-3,6-disulphonic acid are dissolved in 35 ml. of water and 12 ml. of pyridine. This solution is cooled to 2° C. and added all at once to the diazo solution 1.1. The pH-value is adjusted to 8.5 with 24% strength ammonia solution and the mixture is stirred for 90 minutes at 2 to 5° C. It is then warmed to 50° C. and kept at this temperature for one hour. The dyestuff has partly precipitated. The mixture is diluted to 600 ml. with ethanol and the product is filtered off and washed with alcohol until the alcohol issues colourless. The dyestuff, in 50 ml. of dimethylsulphoxide, is warmed to 100° C., the mixture is cooled to 20° C. and filtered, and the residue is washed with ethanol until this issues colourless. Further pure dyestuff can be precipitated from the dimethylsulphoxide mother liquor by adding 60 ml. of ethanol, and is filtered off and washed with ethanol. Yield after drying at 100° C.: 4.3 g. of dyestuff of Formula 101 [see Table I].

The dyestuffs of Formulae 102 and 103 of Table I are manufactured analogously.

Example 2

The dyestuff of Formula 101 can also be manufactured as follows:

(2.1) 25.2 g. of 1-(p-methylsulphonylamino-benzoyl-amino)- 8-naphthol-3,6-disulphonic acid are dissolved in 200 ml. of water and 2 ml. of 24% strength ammonia solution, 20 g. of sodium tetraborate are added and the mixture is adjusted to a pH-value of 10.2 with 8.8 ml. of 4 N sodium hydroxide solution. 180 g. of ice are added and the temperature is adjusted to 5–6° C. A diazo solution, prepared in the usual manner, from 7.92 g. of 2,5-dimethoxy-4-nitroaniline is run in over the course of ½ hour, and at the same time the pH-value is kept at 10 to 11 by dropwise addition of 2 N sodium hydroxide solution. When dropwise addition is compelte, the mixture is stirred for a further ½ hour at room temperature and is then warmed to 65° C. and kept for one hour at this temperature. It is then cooled to 5° C. and the dyestuff which has separated out is filtered off and washed with 2000 ml. of 5% strength sodium chloride solution.

(2.2) 3.8 g. of dyestuff according to 2.1 are stirred for one hour with 50 ml. of water and the suspension is adjusted to a pH-value of 10.2 with 10 N sodium hydroxide solution. 1.2 ml. of 1 molar aqueous sodium sulphide solution are then added and the mixture is warmed to 40–41° C. After 16 hours a sample is taken and a chromatogram is produced therewith. After completion of the reduction the chromatogram shows the blue spot of the reduced dyestuff. If alongside this the red spot of the nitro dyestuff still occurs, the reduction is not yet complete and warming must be continued. After completion of the reduction, 4.3 g. of sodium bicarbonate are added and the dyestuff is precipitated with 140 ml. of ethanol and washed with 100 ml. of 65% strength ethanol and then with 100 ml. of 90% strength ethanol. Yield: 2.9 g. of dyestuff.

(2.3) 3.4 g. of dyestuff according to 2.2 are dissolved in 46 ml. of water at 70° C., the mixture is stirred for ½ hour, cooled to room temperature and mixed with 24 g. of ice, and 3.9 ml. of naphthalenesulphonic acid solution (compare Example 1, section 1.1) and 1 ml. of 4 N sodium nitrite solution are added. The mixture is stirred for 3 hours at 2 to 4° C.

2.7 g. of 2-naphthol-7-sulphonic acid are dissolved in 19 ml. of water at 50° C. 1.8 ml. of 10 N sodium hydroxide solution are then added together with such an amount of ice that the temperature drops to 2–4° C., and 6.9 ml. of pyridine and 2.1 ml. of 30% strength sodium hydroxide solution are then added. This solution is added all at once to the diazo solution manufactured above, and the mixture is stirred for one hour at room temperature and subsequently warmed to 65° C. for one hour. It is then cooled to 5° C. and the dyestuff which has separated out is filtered off, washed with 300 ml. of 5% strength sodium chloride solution and dried in vacuo at 60° C. Yield, 2 g. of dyestuff of Formula 101.

Example 3

45 g. of 1-(p-succinylaminobenzoylamino)-8-naphthol-3,6-disulphonic acid are dissolved in 120 ml. of water and 12 ml. of pyridine, and the solution is cooled to 2–3° C. and added all at once to the diazo solution, cooled to 2–5° C., from 25.2 g. of 1-(4'-amino-2',5'-dimethoxyphenyl-azo)-2-naphthol-7-sulphonic acid, manufactured according to Example 1. The pH-value is adjusted to 8.5 with about 55 ml. of 24% strength ammonia solution and the mixture is stirred for one hour at 2 to 5° C., then warmed to 60° C. and stirred for one hour at this temperature. After cooling to room temperature, 3000 ml. of alcohol are added, the dyestuff which has separated out is filtered off, and the residue is washed with 1000 ml. of ethanol. The dyestuff is dissolved in 300 ml. of dimethylsulphoxide at 100° C., the mixture is filtered hot, the mother liquor is mixed with 600 ml. of ethanol and cooled to 10° C., and the dyestuff which has separated out is filtered off and washed with ethanol until the latter issues colourless. The product is dried at 80° C. in vacuo and 25 g. of dyestuff of Formula 104 are obtained.

The dyestuff of Formula 105 is manufactured analogously from 1 - (p - glutarylaminobenzoylamino) - 8-naphthol-3,6-disulphonic acid.

Example 4

3.2 g. of 1-(4'-chloro-3'-glutarylaminobenzoylamino)-8-naphthol-3,6-disulphonic acid manufactured according to Example D are dissolved in 10 ml. of water and 10 ml. of pyridine, and the solution is cooled to 2° C. and mixed with the diazo solution, manufactured according to Example 1, from 2.1 g. of 1-(4'-amino-2',5'-dimethoxyphenyl-azo)-2-naphthol-7-sulphonic acid. The mixture is stirred for 10 minutes at 2 to 5° C., the pH-value is then adjusted with ammonia to 8–8.2, the whole is stirred for one hour at this temperature, then warmed to 60° C., stirred for one hour at this temperature and cooled to room temperature, the dyestuff is precipitated with 160 ml. of alcohol, the mixture is filtered and the residue is washed with 50 ml. of 45% ethanol and then with 100 ml. of 90% strength ethanol.

2.2 g. of dyestuff of Formula 106 are obtained.

The dyestuff of Formula 107 is manufactured analogously from 1 - (3' - glutarylaminobenzoylamino) - 8-naphthol-3,6-disulphonic acid.

Example 5

(5.1) 5.6 of product manufactured according to Instruction E are dissolved in 50 ml. of water and 5 ml. of sodium tetraborate, and the solution is adjusted with 10 N sodium hydroxide solution to a pH-value of 10, cooled to room temperature and mixed with 45 g. of ice. The temperature is adjusted to 2–4° C. The diazo solution, prepared in the usual manner, from 2 g. of 2,5-dimethoxy-4-nitro-aniline is then added all at once and the mixture is stirred for one hour at 60° C. After cooling, 100 ml. of ethanol are added to the dyestuff solution and the product is filtered off and washed with alcohol until the latter issues colourless. After drying at 60° C. in vacuo, 4.8 g. of dyestuff of formula

(28)
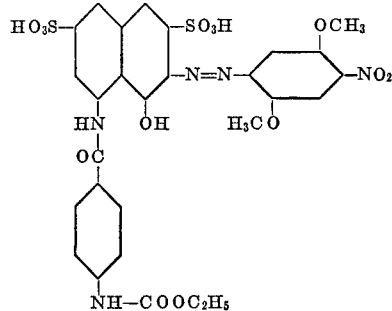

are obtained.

(5.2) 4.8 g. of dyestuff of Formula 28 are dissolved in 100 ml. of water and adjusted to a pH-value of 10.2 by adding 10 N sodium hydroxide solution. 35 ml. of 1 molar sodium sulphide solution are added and the mixture is warmed to 40° C. for 6 hours. A sample is taken, mixed with an equal volume of ethanol, and the product is filtered off, washed with ethanol, dissolved in water and chromatographed. The chromatogram should only show the blue spot of the amino compound and no longer the red spot of the nitro compound. After completion of the reduction, 10 g. of sodium bicarbonate are added, the whole mixed with 50 ml. of ethanol and filtered, and the residue washed with 50 ml. of 50% strength ethanol and with 100 ml. of 90% strength ethanol. Yield: 3.9 g. of dyestuff of formula

(29)
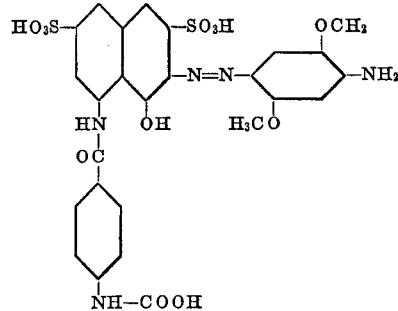

(5.3) 2.1 g. of dyestuff of Formula 29 are dissolved in 42 ml. of water, 6 ml. of naphthalenesulphonic acid (see Example 1, section 1.1) are added, and the mixture cooled to 2° C. and diazotised with 3.4 ml. of N nitrite solution. 1 g. of 2-naphthol-7-sulphonic acid is dissolved in 5 ml. of pyridine, 30 ml. of water and 5 ml. of 24% strength ammonia, the solution is cooled to 2° C., and the diazo solution is added all at once. The mixture is stirred for one hour at room temperature and one hour at 60° C., cooled to room temperature and mixed with 120 ml. of ethanol, the dyestuff which has separated out is filtered off and eluted with 50 ml. of 60% strength ethanol and with 50 ml. of 90% strength ethanol, the residue is dried at 60° C. in vacuo, and 1.2 g. of dyestuff of Formula 108 are obtained.

Example 6

(6.1) 10.8 g. of substance, manufactured according to Instruction F, are coupled with the diazo solution from 3.4 g. of 2,5-dimethoxy-4-nitroaniline analogously to Example 5 to give the dyestuff of formula

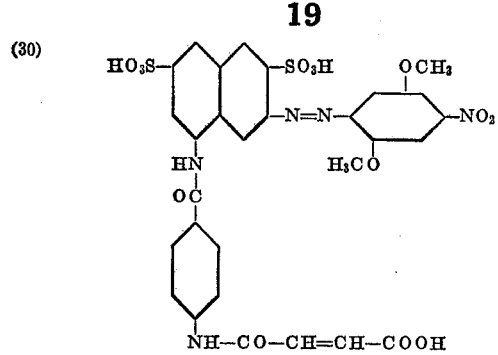

(30)

and this dyestuff is reduced analogously to Example 5.2 to give the dyestuff of formula (31)

$HO_3S$—[naphthalene with $SO_3H$, $HN$, $OH$ substituents]—$N=N$—[benzene with $OCH_3$, $H_3CO$]—$NH_2$ with NH—CO—CH=CH—COOH (6.2) 3.3 g. of dyestuff of Formula 31 are stirred for ½ hour in 44 ml. of water, and the mixture is cooled to 5° C. and treated with 22 g. of ice, 3.8 ml. of naphthalene-sulphonic acid (see Example 1) and 1 ml. of 4 N sodium nitrite solution. The whole is stirred for 2 hours at 2 to 5° C.

1.7 g. of 2-naphthol-7-sulphonic acid are dissolved in 12.5 ml. of water at 50° C. and mixed with 1.16 ml. of 10 N sodium hydroxide solution and such an amount of ice that the temperature drops to 2–4° C. 4.46 ml. of pyridine and the above diazo solution are then added all at once and the mixture is adjusted to a pH-value of 8 to 8.5 with ammonia. The mixture is stirred for one hour at room temperature and one hour at 60° C. 20 ml. of ethanol are then added and the dyestuff which has separated out is filtered off, washed with 20 ml. of a mixture of 15 parts of ethanol and 55 parts of water and subsequently rinsed with 50 ml. of 90% strength ethanol.

2.7 g. of dyestuff of Formula 109 are obtained.

Example 7

The product manufactured according to Instruction G is converted as described in Example 3 to the dyestuff of Formula 110.

Example 8

The product of Formula 23 is converted as described in Example 3 to the dyestuff of Formula 111.

Example 9

The product, manufactured according to Instruction I, is converted as described in Example 3 to the dyestuff of Formula 112. The manufacture of the dyestuff of Formula 113 takes place analogously.

Example 10

The product, manufactured according to Instruction J, is converted as described in Example 1.2 to the dyestuff of Formula 114.

Example 11

6 g. of 1-(4'-amino - 2',5' - dimethoxyphenyl-azo)-2-naphthol-7-sulphonic acid are dissolved in the form of the sodium salt in 300 ml. of water and mixed with 13 ml. of naphthalenesulphonic acid solution (100 ml. contain 0.1 mol of naphthalene-1-sulphonic acid and 0.1 mol of sulphuric acid, representing a total of 0.3 equivalent of acid) and the mixture is cooled to 0° C. and diazotised all at once with 2.3 ml. of 4 N sodium nitrite solution. The mixture is allowed to react for 45 minutes at 0 to 5° C. whilst stirring, the slight excess of nitrous acid is destroyed with a few drops of sulphamic acid and the diazo solution is run at 0 to 10° C. into a solution of 9.5 g. of aminonaphtholsulphonic acid derivatives of Formula 22.1 in 60 ml. of water, 40 ml. of pyridine and 6 ml. of 24% strength ammonia. Whilst running in the diazo solution, the pH-value is kept at between 9.5 and 10 by adding 24% strength ammonia. The mixture is stirred for one hour and warmed to 70–75° C., and the dyestuff is precipitated with ethanol whilst hot, filtered off whilst still hot and washed with hot ethanol until the red-coloured filtrate issues colourless. The residue is dissolved in 150 ml. of water at 70° C. and the dyestuff is precipitated warm with 300 to 400 ml. of ethanol with the addition of a few drops of 7 N potassium acetate solution, filtered off whilst still hot and washed with hot ethanol until the issuing liquid is colourless.

6.8 g. of dyestuff of Formula 115 (see Table I) are obtained in the form of a dark blue powder.

The dyestuffs of Formula 116 to 123 can be manufactured analogously.

If starting from 1-(4'-amino-2',5'-diethoxyphenyl-azo)-2-naphthol-7-sulphonic acid and the compound of Formula 22.5, the dyestuff of Formula 124 is obtained.

Example 12

7.4 g. of the compound of formula

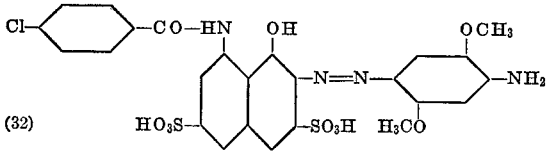

(32)

obtained by coupling of 2,5-dimethoxy-4-nitroaniline with the aminonaphtholsulphonic acid of Formula 22.3 and subsequent reduction of the nitro group to the amino group, are dissolved in 150 ml. of water, mixed with 10 ml. of naphthalenesulphonic acid solution (100 ml. contain 0.1 mol of naphthalene-1-sulphonic acid and 0.1 mol of sulphuric acid, representing a total of 0.3 equivalent of acid), and the mixture cooled to 0° C. and diazotised with 2.4 ml. of 4 N sodium nitrite solution. Reaction is allowed to take place for 30 minutes at 0 to 5° C. whilst stirring, the slight excess of nitrous acid is destroyed with a few drops of sulphamic acid, and the diazo solution is run at 0 to 10° C. into a solution of 4 g. of 2-hydroxynaphthalene-7-sulphonic acid in 50 ml. of water, 10 ml. of picoline and 8 ml. of 24% strength ammonia. The pH-value of the solution is kept between 9.5 and 10 during the coupling. After completion of addition of the diazo solution the mixture is stirred for one hour at room temperature and warmed to 65° C., and the dyestuff is precipitated with ethanol, filtered off whilst still warm and washed with hot ethanol until the initially reddish issuing liquid issues colourless. The residue is dissolved in 150 ml. of water at about 65° C. and the dyestuff is precipitated with 300 to 350 ml. of ethanol, filtered off whilst hot and washed with hot ethanol until the issuing liquid is colourless.

3.2 g. of dyestuff of Formula 125 are obtained in the form of a dark blue powder.

If starting from the diethoxy compound, the dyestuff of Formula 126 is obtained analogously.

The dyestuff of Formula 143 is obtained analogously from 2-(hydroxyethoxy)-4-nitroaniline and the compound of Formula 22.3.

Example 13

Dyestuffs of Formulae 127 and 128 are obtained from the product manufactured according to Instruction L, analogously to the procedure described in Example 11.

Example 14

Analogously to Example 11, the dyestuff of Formula 129 is obtained from the product of Formula 26.1, the dyestuffs of Formulae 130 and 131 from the product of Formula 26.2, the dyestuff of Formula 140 from the product of Formula 22.14, the dyestuff of Formula 144 from the product of Formula 22.15 and the dyestuff of Formula 136 from the product of Formula 22.16.

Example 15

The dyestuff of Formula 132 is obtained from the product manufactured according to Instruction N, analogously to the procedure described in Example 3.

Example 16

Analogously to Example 11, the dyestuff of Formula 133 is obtained by coupling of diazotised 1-(4'-amino-2'-methoxy-5'-methylphenylazo)-2-naphthol-7-sulphonic acid with the compound of Formula 22.3, the dyestuff of Formula 141 is obtained with the compound of Formula 22.8 and the dyestuff of Formula 142 is obtained with the compound of Formula 22.9.

Example 17

5.6 g. of product according to Instruction O are dissolved in 50 ml. of water, cooled to 20° C. and adjusted to a pH-value of 7.0 to 7.2. 5 g. of sodium tetraborate are added, the pH-value is adjusted to 10.2 and 40 g. of ice are added. The temperature should be 0 to 5° C. The diazo solution of 2,5-dimethoxy-4-nitroaniline, manufactured in the usual manner, is then added over the course of 20 minutes, during which the temperature is allowed to rise to 8° C. The mixture is warmed to 65° C. and cooled to 40° C., and the dyestuff which has separated out is filtered off at this temperature and rinsed with 5% strength sodium chloride solution.

This dyestuff is suspended in 200 ml. of water at 40° C. The pH-value is adjusted to 10.2 and 20 ml. of 1 molar sodium sulphide solution are added. The mixture is stirred for 3 hours at 30° C. and warmed to 75° C., and the dyestuff is salted out with sodium chloride. It is filtered off and rinsed with 10% strength sodium chloride solution.

2.4 g. of this dyestuff are suspended in 50 ml. of water and warmed to 70° C. for one hour. The mixture is cooled to 40° C. and mixed with 25 g. of ice so that the temperatured drops to 10° C. 4.5 ml. of 3 N naphthalene-sulphonic acid solution are then added and the mixture is cooled to 60° C. and diazotised with 1.2 ml. of 4 N sodium nitrite solution. The whole is stirred for 2 hours at 2 to 4° C.

This diazo solution is added all at once to a solution of 1.2 g. of 2-naphthol-7-sulphonic acid sodium salt in 20 ml. of water and 1.5 ml. of 24% strength ammonia, with the temperature being kept at 2 to 4° C. by cooling. The mixture is stirred for one hour at this temperature and is then heated to 70° C., mixed with 200 ml. of ethanol and cooled to 10° C., and the dyestuff which has separated out is filtered off and washed with 50% strength ethanol. 1.6 g. of dyestuff of Formula 134 are obtained.

Example 18

11 g. of product from Instruction P are dissolved in 100 ml. of water and the pH-value is adjusted to 7–7.2. 10 g. of sodium tetraborate are then added, the pH-value is adjusted to 10.2 with 10 N sodium hydroxide solution, 75 g. of ice are added and the diazo solution from 4 g. of 2.5-dimethoxy-4-nitroaniline is added over the course of 10 minutes at a pH-value of 10.2 and a temperature below 8° C. The mixture is then warmed to 65° C. and the dyestuff is precipitated by adding 25% strength sodium chloride solution. The dyestuff is filtered off, washed with 100 ml. of 10% strength sodium chloride solution and dried in vacuo at 50° C.

6.5 g. of this dyestuff are dissolved in 100 ml. of water at 40° C. and a pH-value of 10.2. 22 ml. of 1 N sodium sulphide solution are added all at once and the mixture treated with 100 ml. of water. The whole is stirred for 4 hours, sodium bicarbonate is then added so that the pH-value is 9, and the mixture warmed to 55° C. 30 ml. of ethanol are added, and the product is filtered off and eluted with ethanol. After drying in vacuo at 50° C., 3.5 g. of dyestuff are obtained.

2.4 g. of this dyestuff are diazotised analogously to Example 17. This diazo solution is added all at once to the following solution: 4.2 g. of 2-naphthol-7-sulphonic acid solution salt, 25 ml. of water, 25 ml. of pyridine and 7 ml. of 24% strength ammonia solution. The mixture is stirred for one hour at room temperature, warmed for one hour to 70° C., and the dyestuff precipitated by adding 25% strength sodium chloride solution. After cooling to 10° C., the dyestuff which has separated out is filtered off and washed with 50 ml. of 2.5% strength sodium chloride solution and subsequently with 10 ml. of 1.25% strength sodium chloride solution. After drying at 50° C. in vacuo, 2 g. of dyestuff of Formula 135 are obtained.

Example 19

3.15 g. of 1-(4'-benzoyl-benzoylamino) - 8 - naphthol-3,6-disulphonic acid are dissolved in 10 ml. of water and 10 ml. of pyridine, and the solution is cooled to 2° C. and added all at once to the diazo solution manufactured according to Example 1.1. The whole is adjusted to a pH-value of 8.5 with ammonia and then stirred for 1½ hours at 2° C. It is then heated to 60° C. over the course of 30 minutes, cooled to 10° C., and the dyestuff precipitated with 300 ml. of ethanol, filtered off and rinsed with 300 ml. of ethanol. The dyestuff is again dissolved in 200 ml. of water, mixed with 15 ml. of ammonia and precipitated with 400 ml. of ethanol at 70° C.; the dyestuff which has separated out is filtered off, washed with 100 ml. of ethanol and dried in vacuo at 60° C.

1.2 g. of dyestuff of Formula 137 are obtained.

The dyestuffs of Formulae 138 and 139 are manufactured analogously.

TABLE I

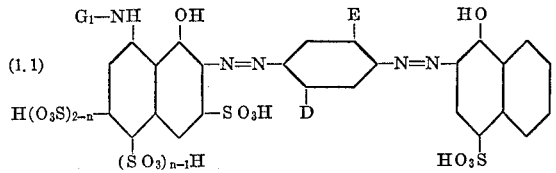

(1.1)

| Dyestuff number | $G_1-$ | n | $-D$ | $-E$ | Absorption maximum (nm.) in— | |
|---|---|---|---|---|---|---|
| | | | | | DMF:$H_2O$ (1:1) | Gelatine |
| (101) | $CH_3SO_2-NH-\langle\rangle-CO-$ | 1 | $-OCH_3$ | $-OCH_3$ | 655+704 | 614 |
| (102) | $\langle\rangle-SO_2-NH-\langle\rangle-CO-$ | 1 | $-OCH_3$ | $-OCH_3$ | 650+700 | 614 |
| (103) | $CH_3-\langle\rangle-SO_2-NH-\langle\rangle-CO-$ | 1 | $-OCH_3$ | $-OCH_3$ | 656+692 | 614 |

TABLE I—Continued

| Dyestuff number | $G_1$— | n | —D | —E | Absorption maximum (nm.) in DMF:H₂O (1:1) | Gelatine |
|---|---|---|---|---|---|---|
| (104) | HOOC—(CH₂)₂CO—NH—⟨C₆H₄⟩—CO— | 1 | —OCH₃ | —OCH₃ | 659+686 | 609 |
| (105) | HOOC—(CH₂)₃CO—NH—⟨C₆H₄⟩—CO— | 1 | —OCH₃ | —OCH₃ | 660+690 | 610 |
| (106) | HOOC—(CH₂)₃CO—NH—⟨C₆H₃(Cl)⟩—CO— | 1 | —OCH₃ | —OCH₃ | 654+690 | 612 |
| (107) | HOOC—(CH₂)₃CO—NH—⟨C₆H₄⟩—CO— | 1 | —OCH₃ | —OCH₃ | 650+690 | 604 |
| (108) | HOOC—NH—⟨C₆H₄⟩—CO— | 1 | —OCH₃ | —OCH₃ | 658+706 | 607 |
| (109) | HOOC—CH=CH—CO—NH—⟨C₆H₄⟩—CO— | 1 | —OCH₃ | —OCH₃ | 653+696 | 612 |
| (110) | ⟨C₆H₅⟩—CO—NH—⟨C₆H₄⟩—CO— | 1 | —OCH₃ | —OCH₃ | 659+708 | 608 |
| (111) | HOOC—⟨C₆H₄⟩—SO₂—NH—⟨C₆H₄⟩—CO— | 1 | —OCH₃ | —OCH₃ | 652+688 | 612 |
| (112) | HOOC—(CH₂)₃—CO—NH—⟨C₆H₄⟩—CO— | 2 | —CHO₃ | —CHH₃ | 655+696 | 656 |
| (113) | HOOC—(CH₂)₂—CO—NH—⟨C₆H₄⟩—CO— | 2 | —OCH₃ | —OCH₃ | 655+698 | 658 |
| (114) | CH₃SO₂—NH—⟨C₆H₄⟩—CO— | 2 | —OCH₃ | —OCH₃ | 648+708 | 618 |
| (115) | Cl—⟨C₆H₃(O₂N)⟩—CO— | 1 | —OCH₃ | —OCH₃ | 656+684 | 614 |
| (116) | Cl—⟨C₆H₄⟩—CO— | 1 | —OCH₃ | —OCH₃ | 657+690 | 609 |
| (117) | H₂N—SO₂—⟨C₆H₄⟩—CO— | 1 | —OCH₃ | —OCH₃ | 652+682 | 610 |
| (118) | H₂N—SO₂—⟨C₆H₄⟩—CO— | 1 | —OCH₃ | —OCH₃ | 658+680 | 610 |
| (119) | CH₃SO₂—⟨C₆H₄⟩—CO— | 1 | —OCH₃ | —OCH₃ | 658+684 | 610 |
| (120) | CH₃SO₂—⟨C₆H₄⟩—CO— | 1 | —OCH₃ | —OCH₃ | 660+680 | 608 |
| (121) | Cl—⟨C₆H₃(Cl)⟩—CO— | 2 | —OCH₃ | —OCH₃ | 656+686 | 614 |
| (122) | H₂N—SO₂—⟨C₆H₃(Cl)⟩—CO— | 1 | —OCH₃ | —OCH₃ | 646+686 | 616 |
| (123) | CH₃NH—SO₂—⟨C₆H₃(Cl)⟩—CO— | 1 | —OCH₃ | —OCH₃ | 656+700 | 610 |
| (124) | H₂N—SO₂—⟨C₆H₄⟩—CO— | 1 | —OC₂H₅ | —OC₂H₅ | 600+700 | 626+648 |

TABLE I—Continued

| Dyestuff number | G₁— | n | —D | —E | Absorption maximum (nm.) in— | |
|---|---|---|---|---|---|---|
| | | | | | DMF:H₂O (1:1) | Gelatine |
| (125) | Cl—⬡—CO— | 1 | —OCH₃ | —OCH₃ | 658+690 | 610 |
| (126) | Cl—⬡—CO— | 1 | —OC₂H₅ | —OC₂H₅ | 660+700 | 622 |
| (127) | CF₃-⬡—CO— | 1 | —OCH₃ | —OCH₃ | 657+706 | 605 |
| (128) | CF₃-⬡—CO— | 1 | —OC₂H₅ | —OC₂H₅ | 660+700 | 636+650 |
| (129) | O₂N-⬡—CO— | 1 | —OCH₃ | —OCH₃ | 654+706 | 612 |
| (130) | O₂N—⬡—CO— | 1 | —OCH₃ | —OCH₃ | 660+704 | 612 |
| (131) | O₂N—⬡—CO— | 1 | —OC₂H₅ | —OC₂H₅ | 660+702 | 626+648 |
| (132) | ⬠(S)—CO—NH—⬡—CO— | 1 | —OCH₃ | —OCH₃ | 662+706 | 612 |
| (133) | Cl—⬡—CO— | 1 | —CH₃ | —OCH₃ | 634+682 | 684+760 |
| (134) | H-C(=O)—HN—⬡—CO— | 1 | —OCH₃ | —OCH₃ | 658+700 | 608 |
| (135) | H₃CO—⬡(H₃CO)—CO— | 1 | —OCH₃ | —OCH₃ | 656+707 | 646 |
| (136) | H₃C—⬡—CO— | 1 | —OCH₃ | —OCH₃ | 664+702 | 601+732 |
| (137) | ⬡—CO—⬡—CO— | 1 | —OCH₃ | —OCH₃ | 650+701 | 610+734 |
| (138) | Cl—⬡—CO—⬡—CO— | 1 | —OCH₃ | —OCH₃ | 654+700 | 620+736 |
| (139) | Cl—⬡(Cl)—CO—⬡—CO— | 1 | —OCH₃ | —OCH₃ | 654+700 | 609+740 |
| (140) | N≡C—⬡—CO— | 1 | —OCH₃ | —OCH₃ | 653+700 | 608 |
| (141) | Cl—⬡(Cl)—CO— | 1 | —CH₃ | —OCH₃ | 633+681 | 680+756 |
| (142) | Cl—⬡(H₂NO₂S)—CO— | 1 | —CH₃ | —OCH₃ | 632+679 | 610 |
| (143) | Cl—⬡—CO— | 1 | —OCH₂CH₂OH | —H | 612+650 | 554+674 |
| (144) | ⬡—SO₂—⬡—CO— | 1 | —OCH₃ | —OCH₃ | 659+710 | 622+648 |

USE EXAMPLES

Example 1

3.3 ml. of a 6% strength gelatine solution, 2.0 ml. of a 1% strength aqueous solution of the hardener of formula (33)

[Structure: triazine with two Cl substituents and an NH-phenyl-SO₃H group]

0.5 ml. of a 1% strength aqueous solution of the blue-green dyestuff of Formula 119 and 3.3 ml. of silver bromide emulsion containing 35 g. of silver per litre are pipetted into a test tube and made up to 10.0 ml. with deionised water. This solution is vigorously stirred and kept for 5 minutes in a waterbath at 40° C.

The casting solution, which is at 40° C., is cast onto a substrated glass plate of size 13 cm. x 18 cm. After solidification at 10° C., the plate is dried in a drying cabinet with circulating air at 32° C.

A strip, cut to 3.5 cm. x 18 cm., is exposed for 3 seconds with 50 Lux/cm.$^2$ under a step wedge through a blue filter Kodak 2b+49.

Thereafter processing is continued in accordance with the following procedure:

(1) 7 minutes' development in a bath which per litre contains 50 g. of anhydrous sodium sulphite, 12 g. of 4-methylaminophenol sulphate, 2 g. of sodium metaphosphate, 50 g. of anhydrous potassium carbonate and 10 g. of potassium bromide;

(2) 2 minutes' stop-fixing in a bath which per litre contains 15 g. of ammonium thiosulphate, 15 g. of potassium aluminium sulphate, 20 g. of sodium metaborate and 16 ml. of glacial acetic acid;

(3) 2½ minutes' soaking;

(4) 8 minutes' dyestuff bleaching in a bath which per litre contains 100 ml. of 37% strength hydrochloric acid, 150 g. of potassium bromide, 8 g. of thiourea, 5 mg. of dyestuff bleaching catalyst of formula (34)

[Structure: phenanthroline-type with NH₂ and OH substituents]

and 20 ml. of a mixture of 400 ml. of benzyl alcohol, 400 ml. of diethylene glycol and 200 ml. of water;

(5) 2 minutes' soaking;

(6) 8 minutes' bleaching of residual silver in a bath which per litre contains 150 ml. of 37% strength hydrochloric acid, 25 g. of crystalline copper sulphate and 30 g. of potassium bromide;

(7) 2 minutes' soaking;

(8) 4 minutes' fixing as indicated under 2;

(9) 10 minutes' soaking;

(10) 1 minute's treatment in a bath which per litre contains 2 ml. of 40% strength sodium bisulphite solution and 0.5 ml. of a 12.5% strength aqueous solution of a condensation product of 1 mol of n-octadecyl alcohol and 35 mols of ethylene oxide.

A brilliant, highly light-fast blue-green wedge is obtained, which is completely bleached to white at the position of the originally greatest silver density.

Similar results are obtained if instead of the dyestuff of Formula 119 one of the remaining dyestuffs of Table I is used.

Example 2

The following layers are successively applied to an opaque white acetate film provided with an adhesive layer:

(1) Red-sensitive silver bromide emulsion in gelatine, containing the greenish-blue dyestuff of Formula 101.

(2) Colourless gelatine layer without silver halide.

(3) Green-sensitive silver bromide emulsion in gelatine, containing the purple dyestuff of formula (35)

[Structure: bis-azo dyestuff]

(4) Blue-sensitive silver bromide emulsion in gelatine, containing the yellow dyestuff of the formula (36)

[Structure: bis-azo dyestuff with methoxy groups]

The gelatine layers can further contain additives such as wetting agents, hardeners and stabilisers for the silver halide. In other respects the procedure followed is such that the individual layers contain 0.5 g. of the particular dyestuff, and the amount of silver bromide corresponding to 1 to 1.2 g. of silver, per square metre of film.

This film is exposed under a coloured diapositive, using red, green and blue copying light. Thereafter the copy is developed in accordance with the following instruction:

(1) 6 minutes' development in a bath which per litre of water contains 50 g. of anhydrous sodium sulphite, 0.2 g. of 1-phenyl-3-pyrazolidone, 6 g. of hydroquinone, 35 g. of anhydrous sodium carbonate, 4 g. of potassium bromide and 0.3 g. of benztriazole;

(2) 5 minutes' soaking;

(3) 6 minutes' fixing in a solution of 200 g. of crystalline sodium thiosulphate and 20 g. of potassium metabisulphite in 1 litre of water;

(4) 5 minutes' soaking;

(5) 3 to 12 minutes' dyestuff bleaching with a solution which per litre of water contains 50 to 80 g. of potassium bromide, 40 to 80 g. of thiourea, 35 to 80 g. of 30% strength sulphuric acid and, if desired, 0.001 to 0.01 g. of dyestuff bleaching catalyst of Formula 34;

(6) 10 minutes' soaking;

(7) 5 minutes' bleaching of residual silver with a solution of 60 g. of crystalline copper sulphate, 80 g. of potassium bromide and 15 ml. of 30% strength hydrochloric acid per litre of water;

(8) 5 minutes' soaking;

(9) 5 minutes' fixing as indicated under 3;

(10) 5 minutes' soaking.

A light-stable, document-fast, positive direct-viewing image is obtained.

Similar results are obtained if instead of the the dyestuff of Formula 101 a different dyestuff of Table I is used.

Example 3

3.3 ml. of a 6% strength gelatine solution, 2.0 ml. of a 1% strength aqueous solution of the hardener of Formula 33 and 0.5 ml. of a 1% strength aqueous solution of the blue-green dyestuff of Formula 122 are pipetted into a test tube and made up to 10.0 ml. with deionised water. The whole is thoroughly mixed and kept at 40° C. in a waterbath for 5 minutes.

The casting solution, which is at 40° C., is cast onto a substrated glass plate of size 13 cm. x 18 cm. After solidification at 10° C., the plate is dried in a drying cabinet with circulating air at 32° C.

A mixture of 3.3 ml. of a 6% strength gelatine solution, 2.0 ml. of a 1% strength aqueous solution of the hardener of Formula 33, 3.3 ml. of silver bromide emulsion containing 35 g. of silver per litre and 1.4 ml. of deionised water is then applied to the dried layer at 40° C., and allowed to solidify and dry as indicated above.

A strip, cut to 3.5 cm. x 18 cm., is exposed for 10 seconds with 50 Lux/cm.² under a step wedge, through a blue filter Kodak 2b+49.

Thereafter the procedure described in Use Example 1 is followed, but instead of the dyestuff bleaching catalyst of Formula 34 the dyestuff bleaching catalyst of formula 37)

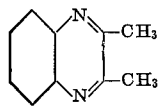

is used. A brilliant, highly light-fast blue-green wedge is obtained, which is completely bleached to white in the position of the originally greatest silver density.

Similar results are obtained if instead of the dyestuff of Formula 122 one of the remaining dyestuffs of Table I is used.

Example 4

A test strip which has been manufactured and exposed according to Use Example 1, using the blue-green dyestuff of Formula 119, is processed in accordance with the following procedure:

(1) 5 minutes' development in a bath which per litre contains 1 g. of p-methylaminophenol sulphate, 20 g. of anhydrous sodium sulphite, 4 g. of hydroquinone, 10 g. of anhydrous sodium carbonate, 2 g. of potassium bromide and 3 g. of sodium thiocyanate;

(2) 2 minutes' soaking;

(3) 2 minutes' treatment in a reversal bath which per litre contains 5 g. of potassium bichromate and 5 ml. of 96% strength sulphuric acid;

(4) 4 minutes' soaking;

(5) 5 minutes' treatment in a bath which per litre contains 50 g. of anhydrous sodium sulphite;

(6) 3 minutes' soaking;

(7) 4 minutes' development in a bath which per litre contains 2 g. of 1-phenyl-3-pyrazolidone, 50 g. of anhydrous sodium sulphite, 10 g. of hydroquinone, 50 g. of anhydrous sodium carbonate, 2 g. of sodium hexametaphosphate and 20 ml. of a 1% strength aqueous solution of tert.butylaminoborane;

(8) 2 minutes' soaking;

(9) further treatment as indicated in Use Example 1 under 4 to 10.

A brilliant, highly light-fast blue-green wedge which runs counter to the original pattern is obtained.

Similar results are obtained when using one of the remaining dyestuffs of Table I.

We claim:

1. Photographic, light-sensitive material, characterised in that it contains, on a support, at least one silver halide containing gelatine layer with at least one dystuff of formula

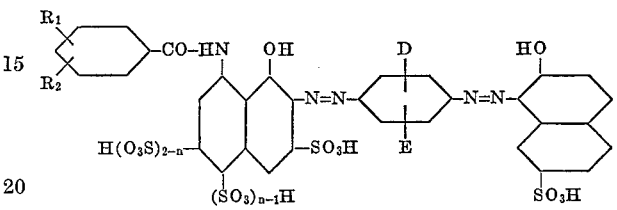

in which the radicals $R_1$ and $R_2$ are in the 3-, 4- or 5-position to the —CO— group and $R_1$ represents a methoxy group or a hydrogen or halogen atom, $R_2$ represents a halogen atom or a methyl, methoxy, nitrile, trifluoromethyl, nitro, W—CO—, X—CO—NH—, $$Y-SO_2-NH-$$

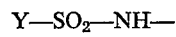

or Z—SO$_2$— group, with W representing a hydroxyl, lower alkyl, lower alkoxy, phenyl or halo phenyl group, X representing a hydrogen atom, or a hydroxyl, HOOC-alkylene, HOOC-alkenylene, phenyl, HOOC-phenylene, HO$_3$S-phenylene, furyl, thienyl or pyridyl group, Y representing a lower alkyl, phenyl, alkylphenylene or HOOC-phenylene group and Z representing a lower alkyl, a phenyl, amino or lower alkyl amino group, D and E independently of one another each denote a hydrogen or chlorine atom or a methyl, methoxy, ethoxy or hydroxyethoxy group and $n$ denotes 1 or 2.

2. Photographic, light-sensitive material according to claim 1 characterised in that it contains a dyestuff of formula

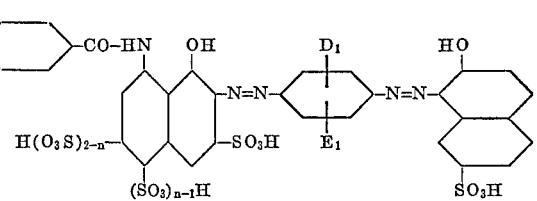

in which $R_3$ represents a halogen atom or a methyl, methoxy, trifluoromethyl, nitro, nitrile, W—CO—, $$X_2-CO-NH$$

Y—SO$_2$—NH— or Z—SO$_2$— group, with $X_2$ denoting a hydrogen atom or a hydroxyl, HOOC-alkylene, HOOC-alkenylene, phenyl or thienyl group $D_1$ and $E_1$ independently of one another each denote a methyl, methoxy, ethoxy or hydroxyethoxy group and $R_1$, W, Y, Z and $n$ having the significance indicated in claim 1, and $R_1$ and $R_3$ are in the 3-, 4- or 5-position to the —CO— group.

3. Photographic, light-sensitive material according to claim 1, characterised in that it contains a dyestuff of formula

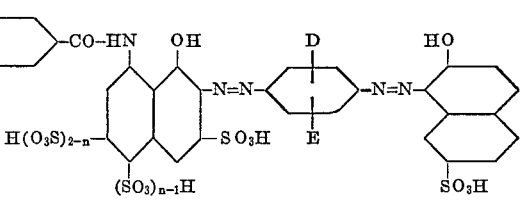

wherein the radicals $R_1$ and $R_4$ are in the 3-, 4- or 5-position to the —CO— group and $R_1$ represents a methoxy group or a hydrogen or halogen atom, $R_4$ represents a halogen atom or a methyl, methoxy, trifluoromethyl, nitro, $X_3$—CO—NH—, Y—SO$_2$—NH— or $Z_1$—SO$_2$— group, with $X_3$ representing a hydroxyl, HOOC-alkylene, HOOC-alkenylene, phenyl, HOOC-phenylene, HO$_3$S-phenylene, furyl, thienyl or pyridyl group, Y representing a lower alkyl, phenyl, alkylphenylene or HOOC-phenylene group and $Z_1$ representing a lower alkyl, amino or lower alkylamino group, D and E independently of one another each denote a hydrogen or chlorine atom or a methyl, methoxy, ethoxy or hydroxyethoxy group, and $n$ denotes 1 or 2.

4. Photographic, light-sensitive material according to claim 2 characterised in that it contains a dyestuff of formula

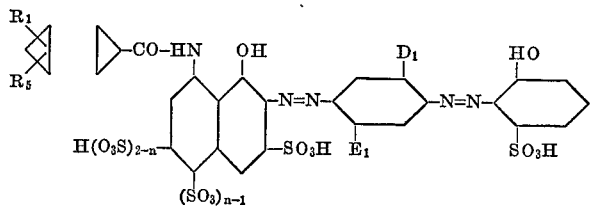

wherein $R_5$ denotes a halogen atom or a methyl, methoxy, trifluoromethyl, nitro, $X_4$—CO—NH—, $$Y\text{—}SO_2\text{—}NH\text{—}$$

or $Z_1$—SO$_2$— group, with $X_4$ representing a hydroxyl, HOOC-alkylene, HOOC-alkenylene, phenyl or thienyl group, $Z_1$ represents lower alkyl, amino or lower alkylomino, $R_1$, Y, $E_1$, $D_1$ and $n$ have the significance indicated in claim 2, and $R_1$ and $R_5$ are in the 3-, 4- or 5-position to the —CO— group.

5. Photographic, light-sensitive material according to claim 3, characterised in that it contains a dyestuff of formula

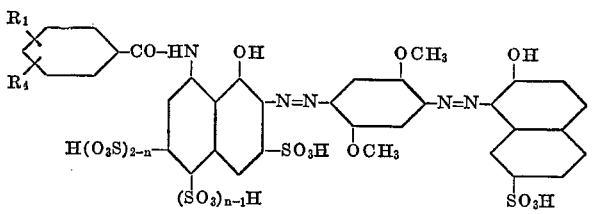

wherein $R_1$, $R_4$ and $n$ have the significance indicated in claim 3.

6. Photographic, light-sensitive material according to claim 3, characterised in that it contains a dyestuff of formula

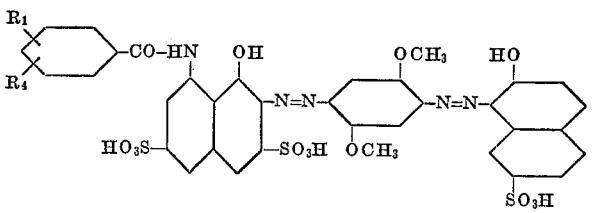

wherein $R_1$ and $R_4$ have the significance indicated in claim 3.

7. Photographic, light-sensitive material according to claim 1, characterised in that it contains a dyestuff of formula

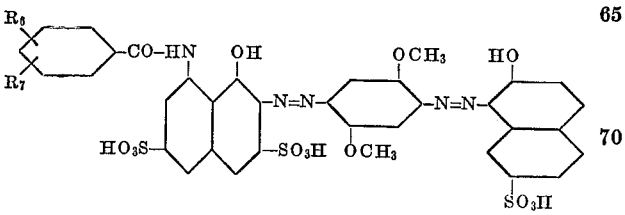

wherein $R_6$ and $R_7$ are in the 3- and 4-position to the —CO— group and $R_6$ denotes a hydrogen or chlorine atom, $R_7$ denotes a chlorine atom or a methyl, methoxy, trifluoromethyl, nitro, $$X_5\text{—}CO\text{—}NH\text{—},\ CH_3\text{—}SO_2\text{—}NH\text{—}$$

or $Z_1$—SO$_2$— group, and with $X_5$ representing a hydroxyl, HOOC-alkylene or HOOC-alkenylene group and $Z_1$ representing a lower alkyl group, amino or lower alkylamino group.

8. Photographic, light-sensitive material according to claim 1, characterised in that it contains a dyestuff of formula

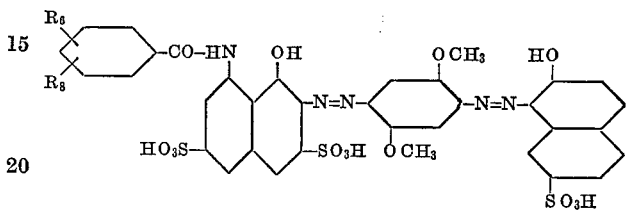

wherein the radicals $R_6$ and $R_8$ are in the 3- and 4-position to the —CO— group, $R_6$ denotes a hydrogen or chlorine atom and $R_8$ denotes a chlorine atom or a trifluoromethyl, nitro,

HOOC—NH—, HOOC—CH$_2$CH$_2$—CO—NH—

HOOC—CH$_2$CH$_2$CH$_2$—CO—NH—

HOOC—CH=CH—CO—NH—

H$_3$C—SO$_2$—NH—, H$_3$C—SO$_2$—

H$_2$N—SO$_2$— or H$_3$C—NH—SO$_2$— group.

9. Photographic, light-sensitive material according to claim 1, characterised in that it contains a dyestuff of formula

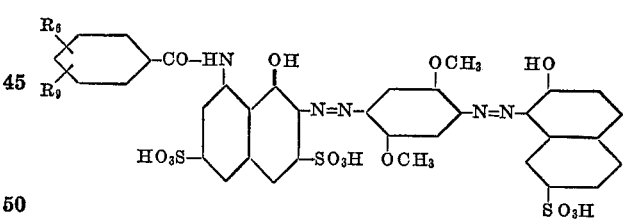

wherein the radicals $R_6$ and $R_9$ are in the 3- and 4-position to the —CO— group, $R_6$ denotes a hydrogen or chlorine atom and $R_9$ denotes a group of formula

HOOC—CH$_2$CH$_2$—CO—NH—

HOOC—CH$_2$CH$_2$CH$_2$—CONH—

CH$_3$—SO$_2$—NH—, CH$_3$—SO$_2$— or

H$_2$N—SO$_2$—

10. Photographic, light-sensitive material according to claim 1, characterised in that it contains a dyestuff of formula

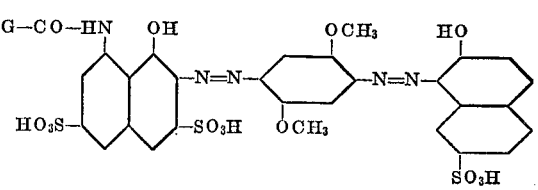

wherein G represents a radical of formula

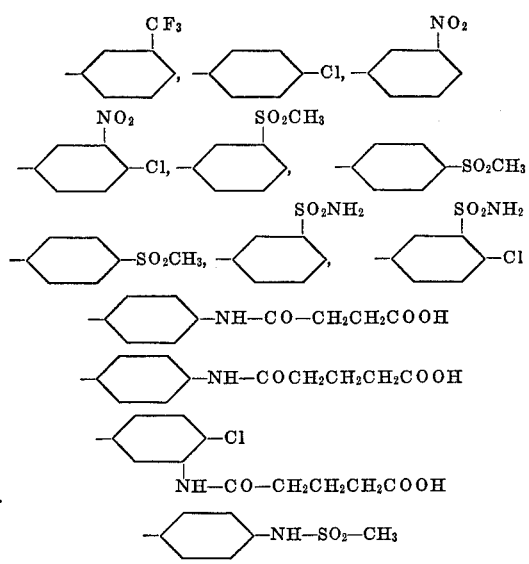

or wherein G₁ represents a radical of formula

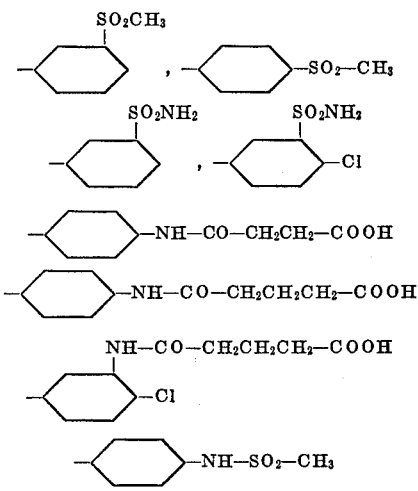

or

12. Photographic, light-sensitive material according to claim 1, characterised in that it contains a dyestuff of formula

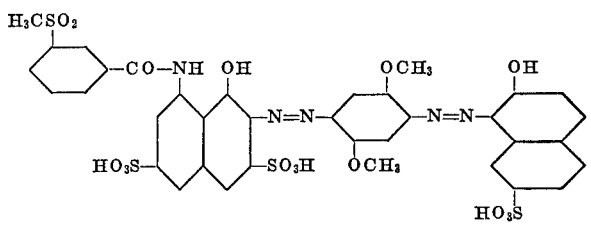

11. Photographic, light-sensitive material according to claim 1, characterised in that it contains a dyestuff of formula

13. Photographic, light-sensitive material according to claim 1, characterised in that it contains a dyestuff of formula

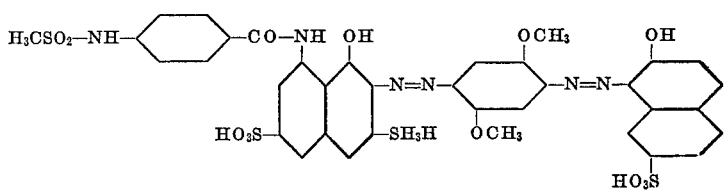

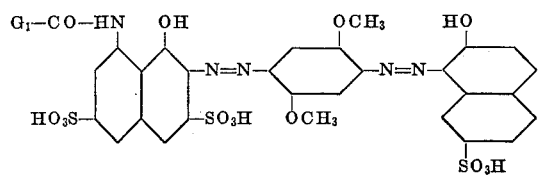

14. Photographic, light-sensitive material according to claim 1, characterised in that it contains a dyestuff of formula

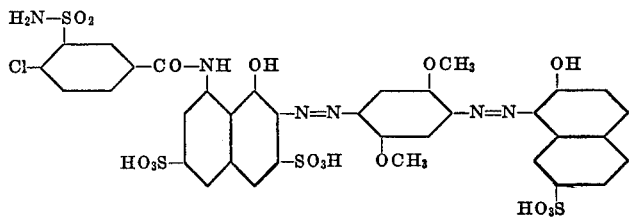

References Cited
UNITED STATES PATENTS 3,157,508   11/1964   Dreyfuss  ----------- 96—99
3,467,522   9/1969   Freytag et al.  ---------- 96—99

J. TRAVIS BROWN, Primary Examiner

U.S. Cl. X.R.

96—20, 53, 73; 260—174

PO-1050
(5/69)

UNITED STATES PATENT OFFICE
CERTIFICATE OF CORRECTION

Patent No. 3,671,253  Dated June 20, 1972

Inventor(s) ALFRED FROEHLICH ET AL

It is certified that error appears in the above-identified patent and that said Letters Patent are hereby corrected as shown below:

Column 31, claim 4, line 16, the formula should read as follows:

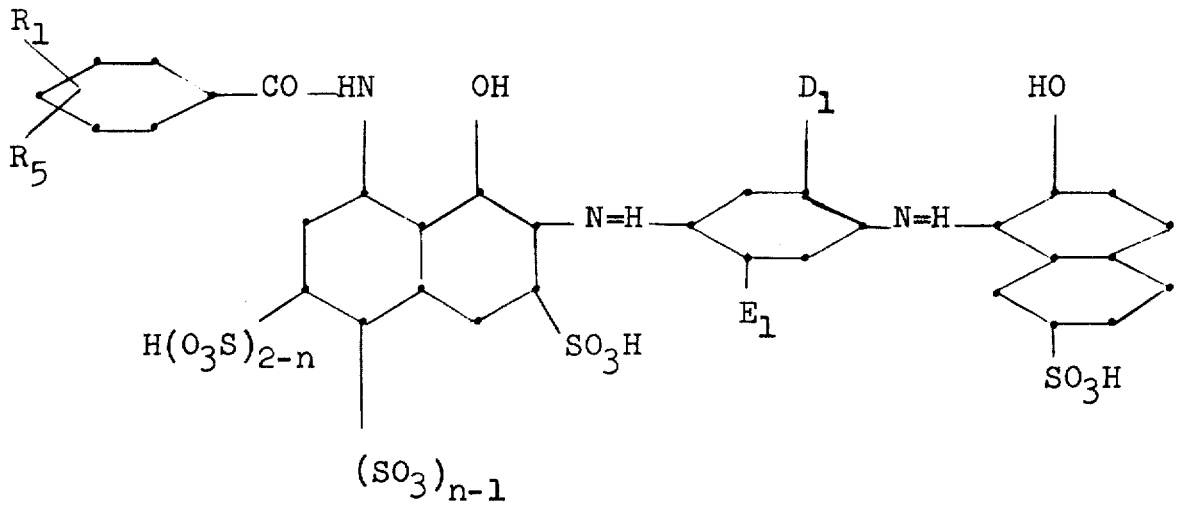

Signed and sealed this 2nd day of April 1974.

(SEAL)
Attest:

EDWARD M. FLETCHER, JR.
Attesting Officer

C. MARSHALL DANN
Commissioner of Patents